Jan. 26, 1965  M. S. DIMITRI  3,167,523
METHOD OF PREPARING RUBBER-MODIFIED LIGNIN BLENDS
Filed Nov. 14, 1960
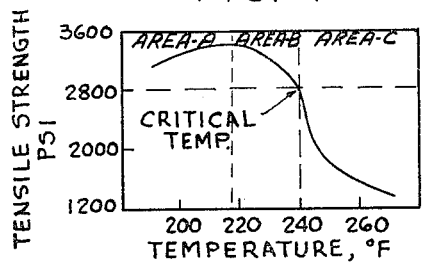
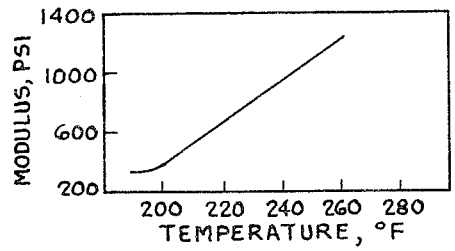
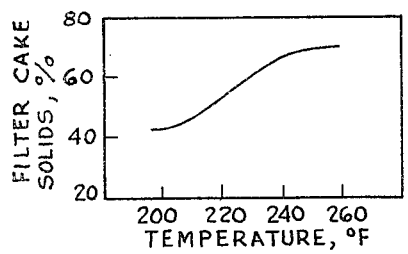
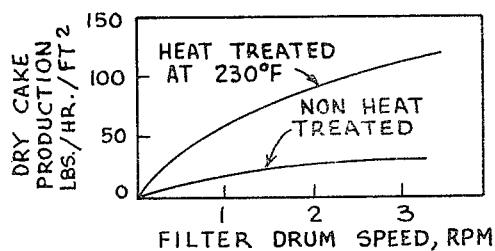
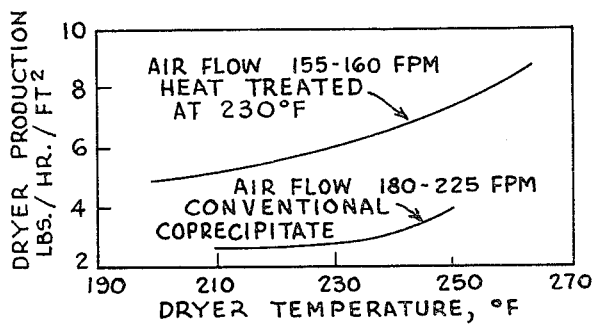
INVENTOR.
MITCHELL S. DIMITRI
BY
AGENT

United States Patent Office 3,167,523
Patented Jan. 26, 1965

3,167,523
METHOD OF PREPARING RUBBER-MODIFIED LIGNIN BLENDS
Mitchell S. Dimitri, Charleston, S.C., assignor to West Virginia Pulp and Paper Company, New York, N.Y., a corporation of Delaware
Filed Nov. 14, 1960, Ser. No. 68,790
14 Claims. (Cl. 260—17.5)

This invention relates to improvements in the production of lignin reinforced rubbers and to improved products obtained thereby.

While lignin has been found to be a very effective reinforcing agent for rubber when incorporated therein by a coprecipitation process as shown in U.S. patent to Pollak 2,608,537, several disadvantageous characteristics of the process have limited any large scale commercialization. The primary disadvantages inherent in the coprecipitation process have been those connected with the physical characteristics of the lignin-rubber coprecipitate. The lignin-rubber coprecipitate, as normally produced, has the nature of a paste or mud which is difficult to process to obtain a dried cake or crumb. The silt-like particles of the coprecipitate, due to their very small size, tend to fill the pores of any filter medium, resulting in very low filtration and washing rates. When filtered and washed, the particles do not possess much cohesiveness and yield a crumbly filter cake which is difficult to handle during subsequent drying operations. The silt-like particles in the filter cake are non-compressible and retain large quantities of water which cannot be expressed by mechanical means and must be removed by application of heat. In general, the solids content of coprecipitate will range from 25 to 35%. These solids may be compared to those obtained in coagulated rubber which are generally between 60 and 70%. A comparison of these figures will show that, while drying of coprecipitate requires the removal of about 2 to 3 pounds of water per pound of lignin-rubber, drying of coagulated rubber requires the removal of only about ½ to ⅔ pound of water per pound of rubber.

While many processes have been proposed for improving the physical characteristics of the coprecipitate, these processes have either not completely solved the problem or have resulted in degradation of the properties of the cured rubber prepared from the coprecipitate. Consequently, it is the primary object of my invention to provide a method whereby the physical characteristics of lignin-rubber coprecipitate can be substantially improved without degrading the properties of the cured rubber stock.

Other objects will become evident from the following disclosure.

I have found that by employing certain types of modified lignin for coprecipitation with the rubber latex to produce a slurry of lignin-rubber particles, that the slurry can then be heated to agglomerate and dehydrate the lignin contained therein, thereby greatly improving the physical characteristics of the coprecipitate. I have further found that, when these modified lignins are thus employed, the heating of the slurry will not cause degradation of the properties of the cured rubber but in fact in many cases will improve the properties of the cured rubber.

The modified lignins which I have found to produce these results consist of oxidized lignin, formaldehyde treated lignin, resole treated lignin and polyvalent metallic salt precipitated lignin.

These modified lignins are very easily prepared and add very little if anything to the cost of the coprecipitate. The oxidized lignins may be prepared by blowing air or any oxygen containing gas through an aqueous alkaline solution of the lignin. This may be done at ambient or elevated temperatures with or without suitable oxidation catalyst. As in most reactions, the higher the temperature employed the faster the oxidation will proceed. Alternately, the lignin may be oxidized by contacting dry particles of the lignin with hot air or oxygen containing material. Another method which may be employed although more expensive is to employ chemical oxidizing agents such as hydrogen peroxide, periodates, persulfates, hypochlorites, ozone, etc. Whatever the method employed, the lignins should be subjected to a substantial degree of oxidation to be usable in the present invention. During oxidation, several changes in the physical nature of the lignin occur which can be measured to determine the extent to which the lignin was oxidized. Among the more notable changes in the lignin during progressive oxidation are increasing viscosity of the lignin in solutions, increasing fusion temperatures of the lignin and decreasing solubility of the lignin in many solvents. Due to the difficulty in accurately measuring changes in fusion points and viscosities, it is preferred practice to determine the extent of oxidation by the acetone solubility of the lignin. In the practice of the present invention the acetone solubility of the oxidized lignin should not exceed 40% and preferably should be reduced to below 15%. These acetone solubilities roughly approximate dry fusion temperatures of the lignin of about 430° F. and 500° F., respectively. In determining the acetone solubility, ten grams of lignin are slurried in 100 ml. of acetone and the slurry agitated at room temperature for five minutes. The slurry is then centrifuged and the supernatant fluid decanted. The remaining solids are reslurried in 100 ml. of acetone and the process repeated until a clear supernatant fluid is obtained. The solids are then dried at 105° C. and weighed to determine the acetone insoluble fraction.

The formaldehyde treated lignins may be prepared by addition of formaldehyde to the lignin solution prior to coprecipitation or by dissolution of the formaldehyde in the slurry of lignin-rubber particles prior to the heat treatment. The quantity of formaldehyde employed preferably is between 7 to 11% by weight of the weight of lignin, although quantities as low as 2.0% by weight of the lignin can be employed. High levels of usage, above 11% appear to merely add to the cost without providing additional benefits. The formaldehyde when added to the aqueous solution will react slowly with the lignin under the alkaline conditions present. The rate of reaction can be speeded up by the application of heat. However, although preferred, it is not necessary to cause prereaction of the formaldehyde with the lignin prior to coprecipitation since under the acidic conditions created upon coprecipitation the reaction of lignin and formaldehyde proceeds very rapidly.

The resole treated lignins can be prepared by addition of the resole to the solution of lignin prior to coprecipitation. As in the case of formaldehyde treatment of lignin, heating of the solution of lignin and resole prior to coprecipitation promotes reaction between the lignin and resole. As the resoles are very highly active and polymerize almost instantaneously under acid conditions, they are not well adapted to being employed by adding them to the acid slurry of lignin-rubber particles after coprecipitation has taken place. The resoles which are alkaline catalyzed condensation products of a phenolic compound and an aldehyde, generally phenol and formaldehyde although other phenolic compounds such as resorcinol, cresylic acid, and cresol, and other aldehydes such as furfural and acetaldehyde, are commonly employed, are soluble in aqueous alkaline solutions as is lignin. The quantity of resole preferably used for treating of the lignin may vary from about 2.5 to 15% by weight of the lignin, although quantities as low as 1% of the weight of the lignin do provide some benefits. Quantities of resole above about 20% by weight of the lignin tend to produce rubber stock which is too hard for many uses and is to be discouraged.

The salt coprecipitated lignins are very simply prepared by the use of a polyvalent metallic salt with or without acid to cause coprecipitation of the lignin and latex. The polyvalent metals all form insoluble lignin salts while at the same time break the latex emulsion resulting in coagulation of the rubber. Although any water soluble salts of a polyvalent metal, such as those of aluminum, barium, cadmium, calcium, chromium, cobalt, copper, iron, lead, magnesium, manganese, mercury, nickel, tin, and zinc may be employed, some of these salts, such as those of copper and iron may be undesirable for use due to their possible deleterious action in certain cured rubbers. From my work to date it appears that salts of zinc, lead, magnesium, aluminum, and calcium are to be preferred.

In the practice of my invention, a coprecipitate slurry of modified lignin and rubber is first prepared by using standard coprecipitation methods of adding a mixture of a solution of lignin with latex to acid or by adding the mixture to a metallic salt solution. When the slurry of modified lignin-rubber particles has been prepared, it is then heated to temperatures above 175° F. The temperature to which the slurry should be heated is primarily dependent upon the modified lignin employed. The formaldehyde and resole treated lignins should be heated to temperature somewhere in the range of 175 to 195° F. while the oxidized lignins and salt coprecipitated lignins should be heated to temperature in excess of 195° F. The exact range of temperatures to which the oxidized and metallic salt lignins should be heated vary a great deal with the degree of oxidation and the type of metallic salt employed. With very highly oxidized lignins, heating up to temperatures of 250° F. will be necessary. With the use of certain salts temperatures must be raised to 270 or 280° F. to obtain good results.

It is apparent from my work that the effect of the heating of the slurry is to agglomerate the lignin-rubber particles and to dehydrate the lignin. While these actions are beneficial to the characteristics of the coprecipitate, heating also may cause fusion of the lignin. This fusion, if it progresses to any substantial degree, results in greatly increased particle size of the lignin and greatly reduced efficiency of the lignin as a reinforcing agent for the rubber. This necessarily results in vastly lowered properties in the final cured rubber. While dry fusion temperatures of all of the modified lignins described hereinabove are greatly in excess of the temperature to which the lignin in the slurry are subjected, the fusion temperatures of the lignins are drastically reduced in the presence of moisture or water. Consequently, in order to maintain the excellent properties of the final cured rubber the slurry must not be heated above the relatively low temperature at which the lignin undergoes substantial fusion in the aqueous medium. The temperature at which agglomeration and dehydration of the lignin occurs appears to be directly related to the temperature at which substantial fusion of the lignin occurs. The temperature at which agglomeration and dehydration of the lignin begins is only some 25 or 35° F. below the temperature at which substantial fusion occurs. It is therefore necessary in order to obtain the benefits of the heat treatment of the slurry to achieve good characteristics in the coprecipitate, while maintaining the excellent properties of the cured rubber, to carefully conduct the heating of the slurry within a very narrow temperature range. In preferred practice of this invention this temperature range is further narrowed since it is desirable to conduct the heating at a temperature as high as possible to cause the greatest agglomeration and dehydration without causing fusion of the lignin.

The effect of heating may be better understood by referring to the attached drawings wherein:

FIGURE 1 is a graph showing the effect of the temperature to which the slurry of an oxidized lignin-rubber coprecipitate is heated on the tensile strength of the cord rubber prepared from the coprecipitate.

FIGURE 2 is a graph showing the effect of the temperature of heat treatment on the modulus (stress at 300% strain) of the cured rubber.

FIGURE 3 is a graph showing the effect of the temperature of heat treatment on the solids content of the dewatered, undried coprecipitate.

FIGURE 4 is a graph showing comparative filtering rates for a heat treated and a non-heat treated coprecipitate.

FIGURE 5 is a graph showing comparative drying rates of a heat treated and a non-heat treated coprecipitate.

The data from which the graphs of these figures were prepared was obtained employing an oxidized lignin a dry fusion temperature of about 560° F. While the graphs are indicative of the general results obtained upon increasing the heat treatment temperature with any of the modified lignins, the temperature-property relationship shown in the graphs are obviously not applicable to modified lignins other than an oxidized lignin having a fusion temperature of about 560° F.

As will be seen in FIGURE 1, the temperature to which the slurry is heated has a very profound effect on the tensile strength of the cured rubber. These temperatures of heat treatment may be divided into three zones dependent on the effect of the temperatures within that zone on the tensile strength. In the initial zone, Area A, increasing the temperature of heat treatment results in slightly increasing tensile strengths. In the second zone, Area B, increasing the temperature of heat treatment resulting in slightly decreasing tensile strengths, while in the final zone, Area C, increasing of the heat treatment temperature results in rapidly decreasing tensile strengths. It has been determined by a study of electron photomicrographs that temperatures within the range of Area C cause substantial fusion of the lignin with a resultant increase in the size of the lignin particle. The temperature at which substantial fusion of the lignin begins is indicated in FIGURE 1 as the "critical temperature." This critical temperature divides Areas B and C and should not be exceeded during the practice of this invention. The critical temperature generally occurs at a point whereat the tensile strength has been decreased to about 80% of the maximum tensile obtained. While this may appear to be a very substantial decrease, it should be kept in mind that due to the increases in tensile strength obtained within Area A that the tensile strength of the rubber which has been heated to the critical temperature is only about 5 to 10% below that of a non-heated rubber.

In FIGURE 2 it will be seen that increasing the temperature to which the slurry is heated results in a steady rise in the modulus of the rubber. It should be noted that the modulus continues to increase with increasing heat treatment temperature at temperatures above the critical temperature of the lignin which for the oxidized lignin employed was about 240° F.

The increases in solids content of the dewatered undried coprecipitate upon increasing the temperature of the heat treatment will be seen in FIGURE 3. As will be noted from this figure, dehydration, with resultant increase in solids, does not begin until tempratures above about 205° F. are reached. At this low temperature very little dehydration has occurred and only a slight increase in solids is obtained. Increasing the temperature of heat treatment causes an increase in the solids until at a temperature about 250° F. or about 10° F. above the critical temperature of the lignin, a maximum solids content of about 70%, is obtained.

If the information shown in FIGURES 1 through 3 is compared, it will be noticed that while it is desirable to heat the slurry to temperatures as high as possible to obtain the increased solids, this cannot be done without destroying the tensile strength of the cured rubber. Since the decrease in tensile strength is also accompanied by decreases in other properties of the rubber such as abrasion and tear due to the substantial fusion of the lignin, it is extremely undesirable from the standpoint of this invention to heat the slurry to temperatures above the critical temperature of the lignin employed.

The improvements in the filtering and drying characteristics of coprecipitate produced by heat treating according to this invention as compared to a non-heat treated coprecipitate may be observed in FIGURES 4 and 5. It will be seen that heat treatment to 230° F., which is some 10° F. below the critical temperature almost quadrupled the filtering rates and about doubled the drying rate of the coprecipitate.

Heating of the slurry can be accomplished by many suitable methods so long as the methods employed provide fairly uniform heating of the slurry without the use of high degree of agitation. As has been indicated, the temperature to which the slurry is heated can be very critical particularly when temperatures at or near the critical temperature is employed. Non-uniform heating resulting in localized hot spots may result in poor rubber stock. As the heating causes a relatively weak agglomeration of the silt-like rubber particles, excessive agitation of the slurry during heating will tend to break these weak bonds between particles. Such a breakdown of the particles naturally results in a loss of the good filtration properties obtainable through heat treating. Although many means such as shell and tube heat exchangers may be employed satisfactorily the preferred method is to use direct injection of steam. The passage of the hot steam through the slurry provides very uniform heating without creating undue turbulence. It will of course be realized that heating of the slurry will necessitate heating under superatmospheric pressure. In most cases heating to above about 200° F. is best conducted under pressure to prevent a thickening of the slurry due to excessive evaporation of water.

It appears from my work that maintaining the slurry at a temperature for a long period of time has somewhat the same effect as heating to a temperature several degrees higher for a shorter period of time. While the effective temperature increase, due to long retention times, is probably only slight, some care should be taken not to maintain the slurry at high temperatures near the critical temperature of the lignin for long periods of time. Preferably the slurry should be heated and then permitted to cool before further processing in order to maintain efficient control of the process.

I have found from my work that the conditions under which the coprecipitation of the lignin and latex is conducted, particularly the temperature of coprecipitation and the pH of coprecipitation, have some effect on the properties of the coprecipitate. When acid is employed to cause coprecipitation, the best properties in the cured rubber are obtained by conducting the coprecipitation at a pH between 3 and 5. To obtain the highest solids content in the dewatered coprecipitate, a slightly lower pH, between 2 and 3, is most desirable. In general, however, any pH between about 1 and 5 can be satisfactorily employed. Where polyvalent metallic salts are employed for causing coprecipitation, the pH ranges do not apply and pH's as high as 8.0 have given good results. For most salts the pH of coprecipitation is between about 3.5 and 7.5. The exact pH is, of course, dependent on the acidity of the particular salt employed.

Although the initial coprecipitation of the lignin and latex can be conducted at any temperature desired, it is preferred practice to conduct the coprecipitation below about 150° F. with the most preferred range being about 120–150° F. This is most easily accomplished by adding the lignin-latex mixture at ambient temperature to hot acid or salt solution at 190–195° F. Coprecipitation temperatures, i.e., the temperature of the slurry immediately after coprecipitation, above about 120° F. tend to give better dispersion of lignin on the rubber with consequent better properties in the rubber. At coprecipitation temperatures above 150° F., however, the lignin-rubber particles formed are in a more finely divided, dispersed form which makes agglomeration somewhat more difficult. The particles obtained at coprecipitations conducted at very high temperatures, i.e., above 175° F. are very finely divided and require a heat treatment of the slurry which raises the temperature of the slurry by at least 10° F. and preferably 25° F. above the temperature of coprecipitation in order to achieve effective agglomeration.

The practice of this invention is set forth in the following examples illustrating the employment of various types of modified lignins and rubbers.

EXAMPLE 1

A series of lignin-rubber coprecipitates were made in which the degree of oxidation of the lignin and the temperature to which the slurry was heated was varied. Oxidation of the kraft pine lignin was accomplished by preparing an alkaline solution of the lignin having a pH of about 11 and blowing air through the solution. The temperature of the solution during oxidation was maintained at about 160–170° F. The degree of oxidation of these lignins was varied solely by varying the time for which the air blowing was conducted. The times varied from about 12 hours to 144 hours during this series and resulted in oxidized lignin having acetone solubilities from about 27% down to about 3.5%.

The lignin-rubber coprecipitates were made by preparing an alkaline solution of the oxidized lignin at about 12% solids. This solution contained 150 grams of precipitatable lignin. The lignin solution was mixed with a butadiene styrene rubber latex of about 20% solids containing 300 grams of rubber solids. (The latex employed was Copo 2110 sold by the Copolymer Rubber and Chemical Corporation.) The lignin-latex while at room temperature was added to about 2000 ml. of hot (190° F.) acid water containing about 35 grams of 60° Bé. (78%) sulfuric acid. The acidification of the lignin-latex mixture caused coprecipitation of the lignin and latex to yield a slurry of well dispersed lignin-rubber particles. Due to slight variances in the process, the pH and temperature of the slurry varied between about 1.8 to 3.0 and 130 to 150° F. respectively. The slurry was then heated to varying temperatures as indicated in the table below. Heating of the slurry was accomplished by passing steam through the slurry. In cases where the slurry was heated to above 210° F. super atmospheric pressure was employed to obtain the temperature. After temperature had been reached, the steam was cut off and the slurry allowed to cool to temperatures slightly above ambient temperature. External water spray was employed for cooling of the coprecipitate heated in an autoclave under super-atmospheric pressure. Although some variance necessarily occurred in the time of heating due to the different temperatures employed, it generally took about 2 minutes to raise the temperature of the slurry to the desired point and ab out 5 minutes for cooling.

The slurry was filtered on a Buchner funnel and washed until the pH of the filtrate was increased to 4 or above. With the few exceptions of highly oxidized lignins which had not been heated to the dehydration temperature, filtration and washing was accomplished very easily. The filter cake was dewatered in the Buchner funnel by means of a rubber dam using a vacuum from an aspirator. Due to the low pressure applied to the cake under this system some free water existed in the cake which could be expressed by squeezing. The cakes were very compressive and cohesive and could be sheeted out if desired.

The filter cake was broken up and dried at 220° F.

The dried cake was then compounded, cured and tested according to ASTM methods.

The following recipe was employed in compounding of the coprecipitate:

| Material— | Quantity |
|---|---|
| Coprecipitate | 150 |
| Stearic acid | 1 |
| BRT #4 (coal tar plasticizer) | 5 |
| Zinc oxide | 5 |
| ALTAX (benzothiazyl disulfide) | 1.5 |
| Cumate (copper dimethyl dithiocarbamate) | 0.3 |
| Sulfur | 2.5 |

The coprecipitate was broken down on a cold mill for 10 minutes when the stearic acid was added and milled in for five minutes. The BRT was then milled in for five minutes when the zinc oxide, ALTAX, and Cumate were added and milled in. The sulfur was added five minutes later and the entire compound milled for five minutes before sheeting out of the stock.

The rubber stock was cured at 287° F. for 30, 40, and 60 minutes and tested. The medium properties obtained at optimum cure are reported in the following table.

Controls employing an oxidized lignin which had not been heat treated and a non-oxidized lignin which was heat treated to 200° F. were also prepared according to the above procedures and the tests results are also shown in the following table.

12 hour oxidized lignin was heated to above its critical temperature. A general summary of the data in the above table will show that heat treatment of the various oxidized lignins should be conducted within the approximate ranges shown in the following table.

*Table 1A*

| Acetone Solubility, Percent | Oxidation Time, Hrs. | Approximate Preferred Heat Treatment Range, °F. |
|---|---|---|
| 26.2 | 12 | 180–210 |
| 24.5 | 18 | 190–220 |
| 15.7 | 24 | 205–225 |
| 12.2 | 36 | 210–230 |
| 7.4 | 48 | 220–240 |
| 4.4 | 60 | 230–250 |
| 4.8 | 96 | 240–260 |
| 3.5 | 144 | 250–270 |

EXAMPLE 2

A series of coprecipitates were made in which the lignin was treated with varying quantities of formaldehyde prior to heat treatment. In the preparation of these coprecipitates a 27% formalin solution was added to a hot solution of kraft pine lignin and maintained at 140° F. for 45 minutes or at 150° F. for 30 minutes. The lignin-formaldehyde solution was then mixed with a butadiene styrene

*Table 1*

| Run No. | Acetone Solubility of Lignin, percent | Oxidation Time, Hrs. | Heat Treatment Temp., °F. | Filter Cake Solids, percent | Modulus, p.s.i. | Tensile Strength, p.s.i. | Tear, lb./in. | Shore A Hardness |
|---|---|---|---|---|---|---|---|---|
| 1 | 15.7 | 24 | None | 23.9 | 660 | 3,280 | 410 | 86 |
| 2 | 45.6 | 0 | 200 | 57.3 | 520 | 1,600 | 350 | 78 |
| 3 | 26.2 | 12 | 200 | 47.5 | 560 | 3,050 | 390 | 75 |
| 4 | 24.5 | 18 | 200 | 46.9 | 680 | 3,460 | 380 | 83 |
| 5 | 15.7 | 24 | 200 | 44.7 | 700 | 3,320 | 390 | 76 |
| 6 | 12.2 | 36 | 200 | 40.7 | 680 | 3,700 | 380 | 80 |
| 7 | 7.4 | 48 | 200 | 38.8 | 580 | 3,530 | 380 | 77 |
| 8 | 15.7 | 24 | 205 | 45.2 | 650 | 3,220 | 390 | 86 |
| 9 | 15.7 | 24 | 210 | 47.2 | 830 | 3,310 | 460 | 85 |
| 10 | 15.7 | 24 | 215 | 47.6 | 780 | 3,610 | 350 | 84 |
| 11 | 26.2 | 12 | 220 | 59.1 | 680 | 2,290 | 210 | 70 |
| 12 | 24.5 | 18 | 220 | 54.0 | 730 | 3,320 | 440 | 72 |
| 13 | 15.7 | 24 | 220 | 47.9 | 710 | 3,260 | 410 | 75 |
| 14 | 12.2 | 36 | 220 | 43.6 | 510 | 3,330 | 440 | 78 |
| 15 | 7.4 | 48 | 220 | 43.9 | 600 | 3,480 | 410 | 76 |
| 16 | 4.4 | 60 | 220 | 42.2 | 650 | 3,640 | 350 | 81 |
| 17 | 4.8 | 96 | 220 | 44.9 | 650 | 3,400 | 430 | 78 |
| 18 | 15.7 | 24 | 225 | 56.6 | 950 | 3,230 | 390 | 84 |
| 19 | 26.2 | 12 | 230 | 63.6 | 730 | 2,100 | 190 | 70 |
| 20 | 24.5 | 18 | 230 | 60.0 | 790 | 2,510 | 240 | 70 |
| 21 | 15.7 | 24 | 230 | 56.1 | 810 | 2,910 | 300 | 75 |
| 22 | 12.2 | 36 | 230 | 53.8 | 720 | 3,210 | 470 | 73 |
| 23 | 7.4 | 48 | 230 | 48.0 | 680 | 3,470 | 400 | 76 |
| 24 | 4.4 | 60 | 230 | 50.0 | 790 | 3,160 | 440 | 75 |
| 25 | 4.8 | 96 | 230 | 47.6 | 710 | 3,740 | 380 | 75 |
| 26 | 3.5 | 144 | 230 | 40.5 | 630 | 3,400 | 390 | 84 |
| 27 | 7.4 | 48 | 240 | 52.2 | 910 | 3,470 | 400 | 76 |
| 28 | 4.4 | 60 | 240 | 52.2 | 850 | 3,500 | 420 | 75 |
| 29 | 4.8 | 96 | 240 | 46.4 | 780 | 3,480 | 360 | 75 |
| 30 | 3.5 | 144 | 240 | 41.9 | 710 | 3,360 | 440 | 80 |
| 31 | 7.4 | 48 | 250 | 58.0 | 970 | 2,680 | 370 | 75 |
| 32 | 4.4 | 60 | 250 | 59.1 | 760 | 3,040 | 460 | 74 |
| 33 | 4.8 | 96 | 250 | 51.8 | 830 | 3,210 | 380 | 73 |
| 34 | 3.5 | 144 | 250 | 48.3 | 960 | 3,280 | 310 | 82 |
| 35 | 3.5 | 144 | 260 | 52.1 | 980 | 3,850 | 480 | 80 |
| 36 | 3.5 | 144 | 270 | 55.1 | 1,200 | 3,400 | 390 | 73 |

A study of the above table will reveal that by conducting the heat treatment of a given oxidized lignin at the proper temperature that the physical characteristics of the coprecipitate can be greatly improved as indicated by the high filter cake solids content, while maintaining good strength properties in the cured rubber. It will be seen in Run No. 1 where no heat treatment was employed that the physical characteristics of the coprecipitate were very poor and a filter cake solids of only 24% was obtained. In Run No. 2 wherein a non-oxidized kraft pine lignin was heat treated to 200° F. excellent solids were obtained but the tensile strength was seriously affected. This same result can be noted in Runs Nos. 11 and 20 where the latex (Copo 2110) to produce a mixture containing 50 parts by weight of lignin per 100 parts by weight of rubber solids. The mixture was then acidified to pH 2.7 by adding to hot (190° F.) acid water. The temperature of the resultant slurry of lignin-rubber was then raised to 200° F. by direct steam injection and permitted to cool. The coprecipitate was filtered, washed, and dewatered as in Example 1 and dried at 220° F. The coprecipitate handled very easily on the filter and was very similar in physical characteristics to that obtained in Example 1. The dried coprecipitate was compounded, cured and tested employing the procedures shown in Example 1. The following table summarizes the results obtained.

Table 2

| Run No. | Formaldehyde employed, percent by wt. of lignin wt. | Heat Treatment Temp., °F. | Filter Cake Solids, Percent | Modulus, p.s.i. | Tensile, p.s.i. | Tear, lb./in. | Shore A Hardness |
|---|---|---|---|---|---|---|---|
| 1 | 3.6 | 200 | 60.6 | 970 | 3,050 | 300 | 77 |
| 2 | 7.2 | 200 | 56.3 | 1,030 | 3,130 | 350 | 79 |
| 3 | 10.8 | 200 | 58.7 | 840 | 3,150 | 440 | 75 |

EXAMPLE 3

A series of coprecipitates were prepared employing resole treated lignin. These coprecipitates were prepared by adding a low advanced resole, prepared by reaction of 1 mole of phenol and about 2.3 moles of formaldehyde under alkaline conditions, to a solution of sodium lignate. The quantity of resole solids added was equal to 2 and 5% by weight of the weight of the lignin. The lignin-resole solution was mixed with latex, without prior heating at room temperature. The lignin-rubber solids ratio was maintained in these examples at 50:100 to produce a 50 loading rubber. The lignin-latex mixture was acidified with hot (190° F.) acid water to a pH of about 2.5. The resultant slurry was then heated to the temperature indicated in the following table. After heating the coprecipitate was processed as in Example 1 to produce a cured rubber. The data on these runs are shown in the following table.

Table 3

| Run No. | Phenolic Resin Employed, percent by wt. of lignin wt. | Heat Treatment, °F. | Filter Cake Solids, Percent | Modulus, p.s.i. | Tensile Strength, p.s.i. | Tear, lb./in. | Shore A Hardness |
|---|---|---|---|---|---|---|---|
| 1 | 2 | None | 28.7 | 900 | 3,490 | 370 | 90 |
| 2 | 2.5 | 180 | 52.7 | 1,010 | 3,380 | 360 | 64 |
| 3 | 5 | 200 | 62.5 | 1,040 | 3,290 | 340 | 80 |

EXAMPLE 4

A series of coprecipitates were made in which the precipitation of the lignin and latex was brought about by the use of zinc chloride. In this series of runs a lignin-latex mixture containing 50 parts of lignin and 100 parts of rubber solids was prepared. This mixture was added to a hot (190° F.) aqueous solution of zinc chloride. The quantity of zinc chloride in this solution was varied from 20 to 33.3% by weight of the weight of the lignin. The pH of the resultant slurries varied from 5.5 to 6.1. The slurries were heated to various temperatures indicated in the table below and then cooled and processed according to the procedures in Example 1. The results of this series of runs is shown in the following table.

As will be seen in the above table, the salt coprecipitated lignins require very high temperatures to accomplish the dehydration of the lignin. This is generally true of all the polyvalent metallic salts which will require temperatures in excess of about 240° F.

While this invention has been illustrated in the above examples with butadiene-styrene type rubbers it has been found that similar results can be obtained utilizing other types of rubbers available in latex form. Thus natural rubber, butadiene-acrylonitrile, and polysulfide rubber latices have been employed with results similar to those indicated above.

I claim:

1. The method which comprises coprecipitating at a temperature between 120 and 150° F. lignin with rubber latex to produce a slurry of lignin-rubber particles wherein the lignin is a modified lignin selected from the group consisting of oxidized lignin, formaldehyde treated lignin, resole treated lignin, and polyvalent metallic salts of lignin and heating said slurry prior to removal of supernatant liquid therefrom to a temperature of at least 175° F. which is sufficient to cause dehydration of the lignin and agglomeration of the lignin-rubber particles.

2. In the method of preparing rubber reinforced with a heat resistant modified lignin selected from the group consisting of oxidized lignin, formaldehyde treated lignin, resole treated lignin and polyvalent metallic salts of lignin by coprecipitating lignin and rubber from a mixture of a rubber latex and an aqueous alkaline lignin solution to produce an aqueous slurry of modified heat resistant lignin-rubber particles, removing the supernatant water from the lignin-rubber particles and drying the lignin-rubber Table 4

| Run No. | Zinc Chloride Employed, Percent by wt. of lignin wt. | Heat Treatment, °F. | Filter Cake Solids, Percent | Modulus, p.s.i. | Tensile Strength, p.s.i. | Tear, lb./in. | Shore A Hardness |
|---|---|---|---|---|---|---|---|
| 1 | 33.3 | 200 | 28.1 | 660 | 3,240 | 410 | 87 |
| 2 | 33.3 | 250 | 39.8 | 650 | 3,200 | 420 | 87 |
| 3 | 33.3 | 260 | 45.1 | 680 | 3,500 | 380 | 84 |
| 4 | 33.3 | 270 | 51.8 | 700 | 3,290 | 400 | 78 |
| 5 | 26.7 | 250 | 38.8 | 580 | 3,200 | 400 | 80 |
| 6 | 26.7 | 260 | 42.1 | 690 | 3,320 | 400 | 83 |
| 7 | 26.7 | 270 | 50.1 | 710 | 3,320 | 410 | 79 |
| 8 | 20.0 | 250 | 33.2 | 620 | 3,210 | 400 | 83 |
| 9 | 20.0 | 270 | 40.0 | 660 | 3,390 | 410 | 85 | particles, the improvement which comprises heating said aqueous slurry of lignin-rubber particles prior to removal of the supernatant water to raise the temperature of the slurry above that at which coprecipitation of the lignin and rubber occurred to a temperature above 175° F. which is sufficient to cause dehydration of the lignin and agglomeration of the lignin-rubber particles.

3. The method of claim 2 wherein said slurry of lignin-rubber particles is heated to a temperature less than the critical temperature whereat substantial fusion of the lignin occurs.

4. The method of claim 2 wherein heating of the slurry of lignin-rubber coprecipitate is accomplished by direct injection of steam into the slurry.

5. The method which comprises coprecipitating lignin and a rubber latex to produce an aqueous slurry of lignin-rubber particles wherein the lignin is a heat resistant modified lignin selected from the group consisting of oxidized lignin, formaldehyde treated lignin, resole treated lignin, and polyvalent metallic salts of lignin, heating said aqueous slurry of the coprecipitated lignin-rubber particles so as to raise the temperature thereof above the temperature at which coprecipitation occurred to a temperature above 175° F. whereat dehydration of the lignin and agglomeration of the lignin-rubber particles occurs and thereafter removing the supernatant water from the coprecipitated lignin-rubber particles.

6. The method of claim 5 wherein the heat resistant modified lignin is an oxidized lignin having an acetone solubility of less than 40%.

7. The method of claim 6 wherein the oxidized lignin has an acetone solubility of less than 15% and the slurry is heated to a temperature of at least 205° F.

8. The method which comprises preparing a solution of lignin and formaldehyde, mixing said solution with a rubber latex, coprecipitating the lignin and rubber from said mixture to produce a slurry of formaldehyde treated lignin-rubber particles, and heating said slurry prior to removing supernatant liquid therefrom to a temperature above the temperature at which coprecipitation occurred which is above 175° F. and less than 205° F.

9. The method of claim 8 wherein the lignin and formaldehyde are heated together in solution prior to coprecipitating the lignin and latex.

10. The method which comprises coprecipitating lignin and rubber latex from an aqueous mixture thereof to produce an aqueous slurry of lignin-rubber particles, adding formaldehyde to said slurry, and thereafter, prior to removing the supernatant water from said slurry, heating said slurry to a temperature above 175° and less than 205° F. which is above the temperature at which coprecipitation occurred.

11. The method which comprises preparing an aqueous solution of lignin and a resole in admixture with a rubber latex, coprecipitating the lignin and rubber latex to produce an aqueous slurry of resole treated lignin-rubber particles and heating said slurry above the temperature at which coprecipitation occurred to a temperature above 175° F. and less than 205° F. prior to removing the supernatant water from the slurry.

12. The method of claim 11 wherein the lignin and resole are heated together in solution prior to coprecipitation of the lignin and latex.

13. The method which comprises preparing an aqueous mixture of alignin solution and a rubber latex, coprecipitating the lignin and rubber from said mixture by the admixture of said mixture to a solution of a polyvalent metallic salt to produce an aqueous slurry of lignin-rubber particles, and heating said slurry prior to the removal of supernatant water therefrom to a temperature above the temperature at which coprecipitation occurred which is above 240° F.

14. The method of claim 13 wherein the metallic salt is a soluble salt of a metal selected from the group consisting of magnesium, calcium, zinc, and aluminum.

References Cited by the Examiner
UNITED STATES PATENTS

| | | | |
|---|---|---|---|
| 2,608,537 | 8/52 | Pollak | 260—17.5 |
| 2,610,954 | 9/52 | Raff et al. | 260—17.5 |
| 2,845,397 | 7/58 | Mills | 260—17.5 |
| 2,878,197 | 3/59 | Baxter et al. | 260—17.5 |

OTHER REFERENCES

Brauns: The Chemistry of Lignin, 1952, Academic Press Inc., New York, pages 115–123.

JOSEPH L. SCHOFER, *Primary Examiner*.

A. D. SULLIVAN, LEON J. BERCOVITZ,
*Examiners*.